Oct. 11, 1960  P. L'HEUREUX  2,955,665
TANDEM WHEEL ASSEMBLY IMPLEMENT MOUNTING FOR A VEHICLE
Original Filed July 18, 1951
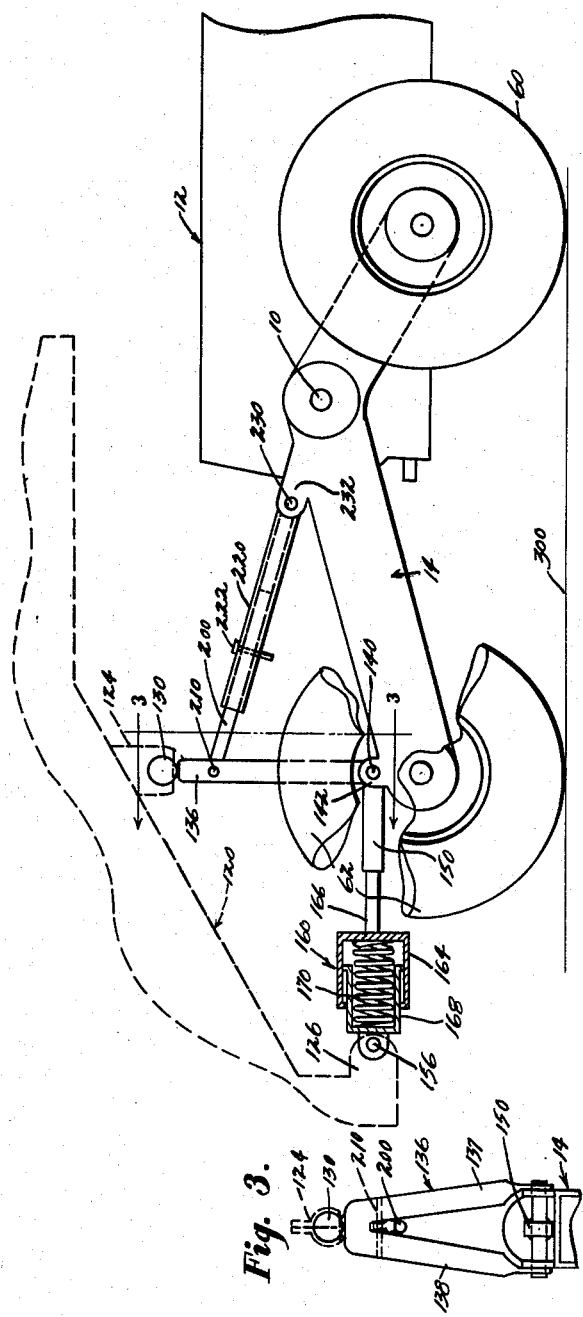
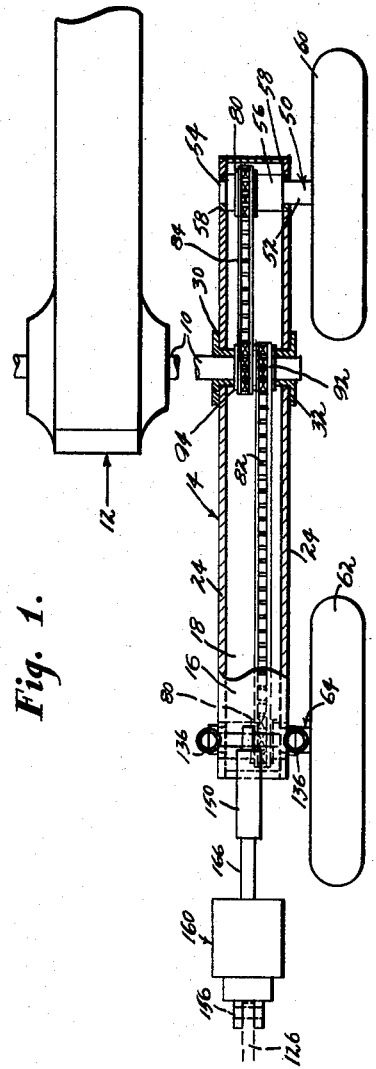
INVENTOR.
Phillaus L'Heureux
BY

United States Patent Office 2,955,665
Patented Oct. 11, 1960

2,955,665

TANDEM WHEEL ASSEMBLY IMPLEMENT MOUNTING FOR A VEHICLE

Phillaus L'Heureux, 3713 S. 83rd St., Omaha, Nebr.

Continuation of abandoned application Ser. No. 237,383, July 18, 1951. This application Nov. 9, 1956, Ser. No. 623,274

5 Claims. (Cl. 180—14)

The invention relates to mounted vehicle agricultural and construction implements and more particularly it is an object of this invention to provide means removably attaching such implements to the common tractor.

Applicant's previously filed application which described similar means for attaching implements to trucks and the like titled "Power Driven Implement Adapter," Serial No. 237,382, filed July 18, 1951, was abandoned on or about September 4, 1955.

This application is a continuation of the applicant's co-pending patent application Serial No. 237,383, filed July 18, 1951, now abandoned.

It is a primary objective to provide means for mounting such implements on the rearward end of a tractor where their weight can be carried by tandem wheels rather than on the forward end of the tractor where the wheels are small and comparatively weak.

Yet another object of the invention is to provide a tandem wheel assembly for a tractor which will improve the traction thereof.

Yet another object of the invention is to provide a device for the purpose described which is sturdy and durable in construction, reliable and efficient in operation, and relatively simple and inexpensive to manufacture, assemble and utilize.

A further object is to provide as an article of manufacture a tandem mounting adapted to receive wheels at its forward and rearward ends and adapted to be attached to an axle or other rotating part of a vehicle at a point disposed substantially closer to one end of a tandem than the other end.

A particular object is to provide tandem wheel assemblies so constructed as to reverse the direction of drive whereby forward vehicle gears can be used for rearward travel as is excellent with a rear-mounted implement with its forward end rearwardmost with respect to the vehicle.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 1 is a side elevation of the rearward portion of a tractor showing the tandem wheel assembly of this invention attached to an axle thereof. A portion of the implement is shown in dotted lines in Figure 1 as supported on the tandem drive of this invention;

Figure 2 is a top plan view of the parts shown in Figure 1 with an upper portion of a tandem housing being broken away. The left hand side of the rearward end of the tractor is not shown as it is a duplicate of the parts shown; and Figure 3 is a view-in-section taken along the line 3—3 of Figure 1.

The tandem drive of this invention is for attachment to the rear axle 10 of a tractor, a rearward portion of which is generally indicated at 12. The tandem drive housing of this invention is generally indicated at 14 and has upper and lower walls 16 and 18 as well as side walls 24.

The housing 14 is of oblong shape in top plan view and in side elevation has forward and rearward portions which converge upwardly toward the axle 10. The housing 14 is provided with bearings 30 and 32 disposed extending through each side wall 24 thereof and suitably secured to the side walls 24. The bearings 30 have internal diameters adapted for receiving the axle 10 and for permitting the housing 14 to rotate freely about the axle 10 as the vehicle passes over uneven terrain. It will be seen that the tandem drive housings 24 are substantially rigid.

At its forward end the housing 14 has an axle member 50 disposed therethrough. The axle member 50 has outer end portions 52 and 54 of smaller diameters than the center portion 56 thereof. The outer portions 52 and 54 are received in bearings 58 attached to the housing 14. The axle portion 52 is secured to a forward tandem wheel 60. A similar arrangement exists at the rearward end of the housing 14, at which a rearward wheel 62 is attached in identical manner to the rearward end of the housing 14 on an axle 64.

The center portions of the axles 50 have roller chain sprockets 80 mounted thereon. Roller chains 82 and 84 extend forwardly from the rearward axle 64 and rearwardly from the forward axle 60 respectively, and are disposed about suitable roller chain sprockets 92 and 94 disposed alongside each other on that portion of the tractor axle 10 which is disposed between the bearings 30 and 32.

The forward sprockets 80 and center sprockets 94 are disposed to one side of the housing 14 while the rearward sprocket 80 and the sprocket 92 are disposed to the opposite side of the housing 18 whereby the roller chain sprockets are longitudinally disposed.

An implement is generally indicated in dotted lines at 120 in Figure 1 and it will be understood that the forward end of the implement 120 projects from the rear end of the tractor 12 for forward implement operation when the tractor moves rearwardly. As best seen in Figure 1, this projecting of the implement causes the implement to be mostly disposed rearwardly of said axles, so that the rearward wheels of the tandem housings normally carry far more of the weight than the forward tandem wheels. The implement 120 is provided with a socket assembly 124 which is preferably disposed upwardly from the rear wheel 62. The socket 124 is disposed upwardly and forwardly of a lug 126 which is also attached to the implement. The lug 126 is disposed rearwardly of the wheel 62. The socket assembly 124 and the lug 126 are on the right hand side of the implement 120 and it will be understood that another socket assembly 124 and another lug 126 are disposed on the left hand side of the implement, not shown.

The socket assembly 124 is for receiving a ball 130 which latter is disposed on the upper end of a first linkage 136 which is pivotally secured to the rearward end of the housing 14 by means of a pin 140 and lugs 142.

The first linkage 136 extends upwardly from the pin 140 to the ball 130. It will be understood that a second linkage similar to the linkage 136 is on the left hand side of the implement, and not shown here.

Hydraulic cylinders 150, a right hand one of which is shown in Figure 1, are pivotally secured by the pins 140 to the rearward ends of the housing 14 and are pivotally secured to the implement 120 indirectly by a pin 156 and by a resilient shock absorbing assembly 160. The pin 156 functions as a connecting point and is disposed downwardly and rearwardly from the connecting point formed by the ball 130.

The shock absorption assembly 160 includes an outer housing 164 which is attached to the piston rod 166 of the cylinder 150. The outer housing 164 is slidably disposed around an inner housing 168. The inner housing 168 is attached to the lug 126 by the pin 156. A coiled compression spring 170 is disposed between the housings 164 and 168 for urging the housings apart.

The linkage 136 has two side portions shown at 137 and 138 which are interconnected at their upper ends and which are secured to the ball 130. Adjacent their upper ends a forwardly and downwardly extending bracing rod 200 is provided attached to the linkage 136 by means of a horizontally disposed pin 210. The linkage 200 is telescopically disposed in a sleeve 220 which is attached to the linkage 200 by means of a removable bolt 222. At its forward end the sleeve 220 is attached by means of a pin 230 to a lug 232 which latter extends rearwardly and upwardly from and is attached to the housing 14 preferably rearwardly and upwardly from the axle 10.

It will be seen that the linkage 200 and the sleeve 220 in cooperation with the removable bolt 222 which extends through suitable apertures in the respective linkage 200 and sleeve 220 provides a releasable attaching means or releasable bracing means for attaching the upper end portions of the first and second linkages 136 to the respective housing 14.

As thus described the tractor, implement and tandem wheel assembly are particularly adapted for the movement of heavy implements across the ground 300. Either wheel 60 or 62 can sink into a depression in the surface of the ground without as great an effect as would be if the implement were mounted upon the rear of the tractor 12 directly. The tandem wheel arrangement makes it possible for the implement and tractor to function as one unit in much the same way as self-propelled agricultural implements are now being used. The arrangement also has the advantage, however, that the tractor 12 can be one which is of general use on a farm whereby the assembly is more affordable than self-propelled units have been heretofore.

From the foregoing description it is thought to be obvious that a tandem wheel assembly implement mounting for a vehicle constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In combination: a vehicle having outwardly extending rear axle ends; longitudinally disposed elongated tandem drive housings disposed one on each side of said vehicle; tandem wheels attached at least one to each end of each drive housing, said housings being pivotally mounted on said rear axle ends at points between the ends of said housings and spaced from the ends thereof for the swinging of the ends of said housings upwardly and downwardly about said axles, said pivotal attaching points being disposed substantially closer to the forward tandem wheels than to the rearward tandem wheels; means drivably interconnecting said wheels and said axle ends; an implement having its rearward end above said housings and having its forward end projecting rearwardly from the rearward end of said vehicle for forward implement operation when said vehicle moves rearwardly; first and second linkages pivotally secured to different ones of said housings and extending upwardly to and being pivotally secured to corresponding sides of said implement at connection points; hydraulic cylinders pivotally secured to the rearward ends of said housings and being pivotally secured to said implement at points on said implement below and rearwardly of said linkage connection points; resilient means pivotally attaching said cylinders to said implement at points on said implement below and rearwardly of said linkage connection points; and releasable bracing means attaching the upper end portions of said first and second linkages to said housings at points forwardly of the lower ends of said first and second linkages.

2. In combination: a vehicle having outwardly extending rear axle ends; longitudinally disposed elongated tandem drive housings disposed one on each side of said vehicle; tandem wheels attached at least one to each end of each drive housing, said housings being pivotally mounted on said rear axle ends at points between the ends of said housings for the swinging of the ends of said housings upwardly and downwardly about said axles; means drivably interconnecting said wheels and said axle ends; an implement having its rearward end above said housings and having its forward end projecting rearwardly from the rearward end of said vehicle for forward implement operation when said vehicle moves rearwardly; first and second linkages pivotally secured to different ones of said housings and extending upwardly to and being pivotally secured to corresponding sides of said implement at connection points; hydraulic cylinders pivotally secured to the rearward ends of said housings and being pivotally secured to said implement at points on said implement below and rearwardly of said linkage connection points; and releasable bracing means attaching the upper end portions of said first and second linkages to said housings at points forwardly of the lower ends of said first and second linkages.

3. In combination: a vehicle having outwardly extending rear axle ends; longitudinally disposed elongated tandem drive housings disposed one on each side of said vehicle; tandem wheels attached at least one to each end of each drive housing, said housings being mounted on said rear axle ends at points between the ends of said housings for the swinging of the ends of said housings upwardly and downwardly about said axles; means drivably interconnecting said wheels and said axle ends; an implement having its rearward end above said housings and having its forward end projecting rearwardly from the rearward end of said tractor for forward implement operation when said tractor moves rearwardly; first and second linkages pivotally secured to different ones of said housings and extending upwardly to and being pivotally secured to corresponding sides of said implement at connection points; and hydraulic cylinders pivotally secured to the rearward ends of said housings and being pivotally secured to said implement at points on said implement below and rearwardly of said linkage connection points.

4. In combination: a vehicle having outwardly extending rear axle ends; longitudinally disposed elongated tandem drive housings disposed one on each side of each vehicle; tandem wheels attached at least one to each end of each drive housing, said housings being mounted on said rear axle ends at points between the ends of said housings for the swinging of the ends of said housing upwardly and downwardly about said axles; means drivably interconnecting said wheels and said axle ends; an implement having its rearward end above said housings and having its forward end projecting rearwardly from the rearward end of said vehicle for forward implement operation when said tractor moves rearwardly; and means interconnecting said implement and said housings for mounting said implement upon said tandem housings, whereby the implement is mostly disposed rearwardly of said axles so that the rearward wheels of said tandem housings normally carry far more of the weight of said implement than the forward tandem wheels.

5. In combination; a vehicle having outwardly extending rear axle ends; longitudinally disposed elongated tandem drive housings disposed one on each side of each vehicle; tandem wheels attached at least one to each end of each drive housing, said housings being pivotally mounted on said rear axle ends at points between the ends of said housings for the swinging of the ends of said housings upwardly and downwardly about said axles; means drivably interconnecting said wheels and said axle ends; an implement having its rearward end above said housings and having its forward end projecting rearwardly from the rearward end of said tractor for forward implement operation when said vehicle moves rearwardly; and means interconnecting said implement and said housings for mounting said implement upon said tandem housings, whereby the implement is mostly disposed rearwardly of said axles so that the rearward wheels of said tandem housings normally carry far more of the weight of said implement than the forward tandem wheels, said pivotal attaching points of said axles and said tandem housings being disposed substantially closer to the forward tandem wheels than to the rearward tandem wheels.

References Cited in the file of this patent

UNITED STATES PATENTS

| | | |
|---|---|---|
| 383,179 | James | May 22, 1888 |
| 1,868,173 | Low | July 19, 1932 |
| 2,362,068 | Hollman et al. | Nov. 7, 1944 |

FOREIGN PATENTS

| | | |
|---|---|---|
| 1,100,405 | France | Apr. 6, 1955 |
| 582,455 | Great Britain | Nov. 18, 1946 |